(12) United States Patent
Abt

(10) Patent No.: US 12,104,516 B2
(45) Date of Patent: Oct. 1, 2024

(54) METHOD AND DEVICE FOR CONTROLLING AT LEAST ONE SCR CATALYTIC CONVERTER OF A VEHICLE

(71) Applicant: FPT MOTORENFORSCHUNG AG, Arbon (CH)

(72) Inventor: Michael Abt, Wil (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 0 days.

(21) Appl. No.: 17/414,523

(22) PCT Filed: Dec. 17, 2019

(86) PCT No.: PCT/IB2019/060907
§ 371 (c)(1),
(2) Date: Jun. 16, 2021

(87) PCT Pub. No.: WO2020/128822
PCT Pub. Date: Jun. 25, 2020

(65) Prior Publication Data
US 2022/0049637 A1    Feb. 17, 2022

(30) Foreign Application Priority Data
Dec. 21, 2018   (IT) .................. 102018000020851

(51) Int. Cl.
*F01N 3/20*    (2006.01)
(52) U.S. Cl.
CPC .......... *F01N 3/208* (2013.01); *F01N 2570/14* (2013.01); *F01N 2610/02* (2013.01);
(Continued)
(58) Field of Classification Search
CPC ................. F01N 3/208; F01N 2610/02; F01N 2900/0406; F01N 2900/0408;
(Continued)

(56) References Cited

U.S. PATENT DOCUMENTS

| 6,833,272 B1 * | 12/2004 | Binder | B01D 53/8631 |
|---|---|---|---|
| | | | 436/151 |
| 8,783,018 B2 * | 7/2014 | Kubinski | B01D 53/9431 |
| | | | 60/303 |

(Continued)

FOREIGN PATENT DOCUMENTS

| JP | 2012-067667 | 4/2012 |
|---|---|---|
| JP | 2013-515897 | 5/2013 |

(Continued)

OTHER PUBLICATIONS

Japanese Notice of Reasons of Refusal in JP Application No. 2021-535814, mailed Jan. 1, 2023, an english translation provided herewith (.

*Primary Examiner* — Phutthiwat Wongwian
*Assistant Examiner* — Diem T Tran
(74) *Attorney, Agent, or Firm* — Leason Ellis LLP

(57) ABSTRACT

A method for controlling a SCR catalytic converter of a vehicle, comprising a first step of modelling said at least one SCR catalytic converter as a plurality of NH3 storage cells (cell1, cell2, . . . , celln; cell1, cell2 . . . celln, cell1, cell2, . . . , celln), a second step of controlling only a first (cell1) of said plurality of storage cells, according to feedback control based on a reference value, and a third step of adapting said reference value on the basis of a storage level of at least another storage cell of said plurality of storage cells, wherein said first storage cell is arranged at an inlet of said SCR catalytic converter according an exhaust gas circulation.

10 Claims, 3 Drawing Sheets

(52) U.S. Cl.
 CPC .............. *F01N 2900/0406* (2013.01); *F01N 2900/0408* (2013.01); *F01N 2900/1622* (2013.01)

(58) Field of Classification Search
 CPC ......... F01N 2900/1622; F01N 2570/14; F01N 2550/02; F01N 2560/021; F01N 2570/18; Y02A 50/20; Y02T 10/12
 See application file for complete search history.

(56) References Cited

U.S. PATENT DOCUMENTS

| | | |
|---|---|---|
| 2009/0049827 A1 | 2/2009 | Wei et al. |
| 2010/0326052 A1 | 12/2010 | Sun |
| 2011/0023591 A1* | 2/2011 | Dobson .................. F01N 11/00 73/114.75 |
| 2012/0096837 A1 | 4/2012 | Yacoub |
| 2013/0064717 A1* | 3/2013 | Masaki .................... F01N 3/18 422/108 |
| 2013/0101485 A1 | 4/2013 | Yacoub et al. |

FOREIGN PATENT DOCUMENTS

| | | |
|---|---|---|
| WO | WO 2011/076839 | 6/2011 |
| WO | 2011118095 | 9/2011 |
| WO | WO 2011/138277 | 11/2011 |

\* cited by examiner

Fig. 1 (State of the art)

METHOD AND DEVICE FOR CONTROLLING AT LEAST ONE SCR CATALYTIC CONVERTER OF A VEHICLE

CROSS-REFERENCE TO RELATED APPLICATIONS

This patent application is a U.S. National Phase Application under 35 U.S.C. § 371 of International Patent Application No. PCT/IB2019/060907, filed on Dec. 17, 2019, which claims priority from Italian patent application no. 102018000020851, filed on Dec. 21, 2018, all of which are incorporated by reference, as if expressly set forth in their respective entireties herein.

FIELD OF THE INVENTION

The present invention relates to a method and device for controlling at least one SCR catalytic converter of a vehicle, in particular in the field of the vehicular combustion engines.

DESCRIPTION OF THE PRIOR ART

Many combustion engines which have to comply with the current and future emission legislation make use of a selective catalytic reduction (SCR) system in order to reduce the nitrogen oxide (NOx) emissions.

In current operational systems, a urea solution is injected in the exhaust gas upstream of the SCR catalyst. The urea is transformed into ammonia (NH3), which in turn reduces the NOx to harmless nitrogen (N2) and water (H2O) in the SCR catalyst. The relevant chemical reactions occur after adsorption of the ammonia on the catalyst surface.

Generally, the NOx conversion efficiency of the SCR catalyst is dependent on the amount of stored (i.e. adsorbed) ammonia, the temperature, the space velocity, i.e. the gas turnover in the catalyst per time unit, the NO2/NO ratio of the NOx, and other conditions. The temperature and the space velocity are usually dependent on the engine operation and cannot be directly influenced by the SCR controller. The amount of stored ammonia is usually adjusted by a dedicated controller, which controls the estimated level of the ammonia. The NO2/NO ratio is dependent on the performance of a diesel oxidation catalyst (DOC) and on a diesel particle filter (DPF) arranged upstream of the SCR catalyst.

Current SCR control systems make use of a model, where the SCR catalyst is modeled as one NH3 storage tank. The amount of stored NH3 is calculated from the injected urea, and from the amount of NH3 consumed by the SCR reactions. The amount of stored ammonia is then adjusted such that the desired NOx conversion efficiency is achieved. An outer control loop using an NOx measurement device is then used to adjust the injected urea quantity such that the estimated, by a model, and the measured NOx conversion efficiency converge.

US2009/0049827 discloses an emissions control system including a feedforward controller configured to calculate a spatially dependent surface coverage of the reduction agent on the SCR catalyst and substantially stops injection of the reduction agent when the spatially dependent surface coverage of the reduction agent exceeds a maximum surface coverage of the reduction agent at one or more spatial locations.

A surface coverage observer includes a model of the SCR catalyst and acts as the memory of the feedforward controller. The surface coverage observer includes two cells arranged in series that are used to calculate the surface coverage on an area of the catalytic converter that each cell represents. A maximum surface coverage value for the first cell is determined using a look-up table and is compared to the calculated surface coverage for the first cell. If the calculated surface coverage value is greater than the maximum surface coverage, the surface coverage observer reduces the amount of ammonia to be injected by a given value.

Control systems of the prior art aim at controlling the storage level, especially in order to avoid NH3 slip.

A parallel computing can be implemented in order to limit of NH3 slip, i.e. of the dispersing an excess of NH3 in the exhaust gas.

FIG. 1 of the state of the art discloses an example of a physical exhaust line 1 comprising a real SCR catalyst 2, a urea dosing module 3, a NOx sensor 4, an NH3 sensor 5, upstream and downstream temperature sensors 6, 7.

An NH3 storage model 8 is fed with the physically relevant inlet and outlet quantities, such as at the input exhaust mass flow, catalyst upstream NOx (NO and NO2) concentration, the amount of injected urea, and the upstream and downstream exhaust temperatures.

The estimated sensor outputs 10, respectively of NOx and NH3, are compared to the measured outputs of sensors 4 and 5. The errors are then used in an observer loop with a given gain 11, to correct the state variables of the estimating models, which are the amounts of stored ammonia in each cell, such that the calculated sensor outputs converge to the measured ones.

Low regulations require NOx abatement device, namely SCR system, increasingly faster in terms of efficiency and promptness. Thus, often, large SCR devices are required or a cascade of two SCR catalysts are implemented and the system disclosed on FIG. 1 is not enough.

At cold start, the urea based reducing agent decomposes in the hot exhaust gas—thermolysis—and on the catalyst inlet surface—hydrolysis—towards NH3. The formed NH3 is then propagating in the gas phase from the inlet towards the outlet of the catalyst and adsorbs on the catalyst surface, whenever free storage sides occur. Once the NH3 is adsorbed on the catalyst surface, the SCR reactions take place to reduce the NOx emissions. The NH3 propagation and the NOx reduction leads to a strongly inhomogeneous axial distribution of NH3 on the catalyst surface.

Thus, at cold starts, a rapid and accurate NH3 saturation of the complete system is rather difficult, causing lack of NOx conversion efficiency.

SUMMARY OF THE INVENTION

Therefore, it is the main object of the present invention to provide a method and device for controlling a SCR catalytic converter of a vehicle which overcomes the above problems/drawbacks.

According to a further aspect of the present invention, the SCR catalyst is considered as divided in a plurality of cascaded cells, and while the storage level of the first cell is controlled in respect of a set point, the storage level of one of the subsequent cells, preferably the last one according to an exhaust gas circulation, is used to adapt the above mentioned set point of the first cell.

The adaptation of the set point implemented to control the first cell, on the basis of at least one of the subsequent cells, permits to achieve an optimal saturation of the SCR at cold start, irrespective of the largeness of the SCR catalyst or the implementation of two or more cascaded SCR catalysts, indeed, even in this last case, the first cell of the first catalyst is controlled while the set point implemented is adapted on the basis of the storage level of the cells, preferably the last one, of the last SCR catalyst.

Since ECU (Engine Control Unit) calculation and memory resources are limited, an advantageous implementation of the present method provides the step of considering the SCR catalyst as comprising several storage cells, however, only two or few storage cells are considered to manage the NH3 storage distribution throughout all said several storage cells.

Therefore, a multiple cell approach is advantageous, since the accuracy can be significantly improved, however, the computational costs remain limited.

These and further objects are achieved by means of a method and device as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

According to the present invention, the term "second element" does not imply the presence of a "first element", first, second, etc. are used only for improving the clarity of the description and they should not be interpreted in a limiting way.

DETAILED DESCRIPTION OF THE PREFERRED EMBODIMENTS

The method and device according to the present invention aims to control the right storage of NH3 in an SCR catalytic converter.

As clarified below, a SCR catalytic converter can include two or more SCR devices, for example each including its own canning. Thus, the method and device according to the present invention is particularly effective because, according to the circumstances, two or more SCR devices, available on the shelf, can be combined to define a SCR catalytic converter. Thus, a sort of overall SCR device suitable to store NH3 and convert NOx.

As for the solution disclosed in the prior art, also the present invention is based on a cells modelling of the SCR catalytic converter storage.

Clearly, such model uses several inputs from real or virtual (modelled) sensors.

The storage capacity is surely function of the temperature of the SCR and space velocity, which depends on the engine working point.

The control of the NH3 storage aims substantially to control the urea based agent dosing module, arranged upstream of the SCR catalytic converter.

Figure 1:
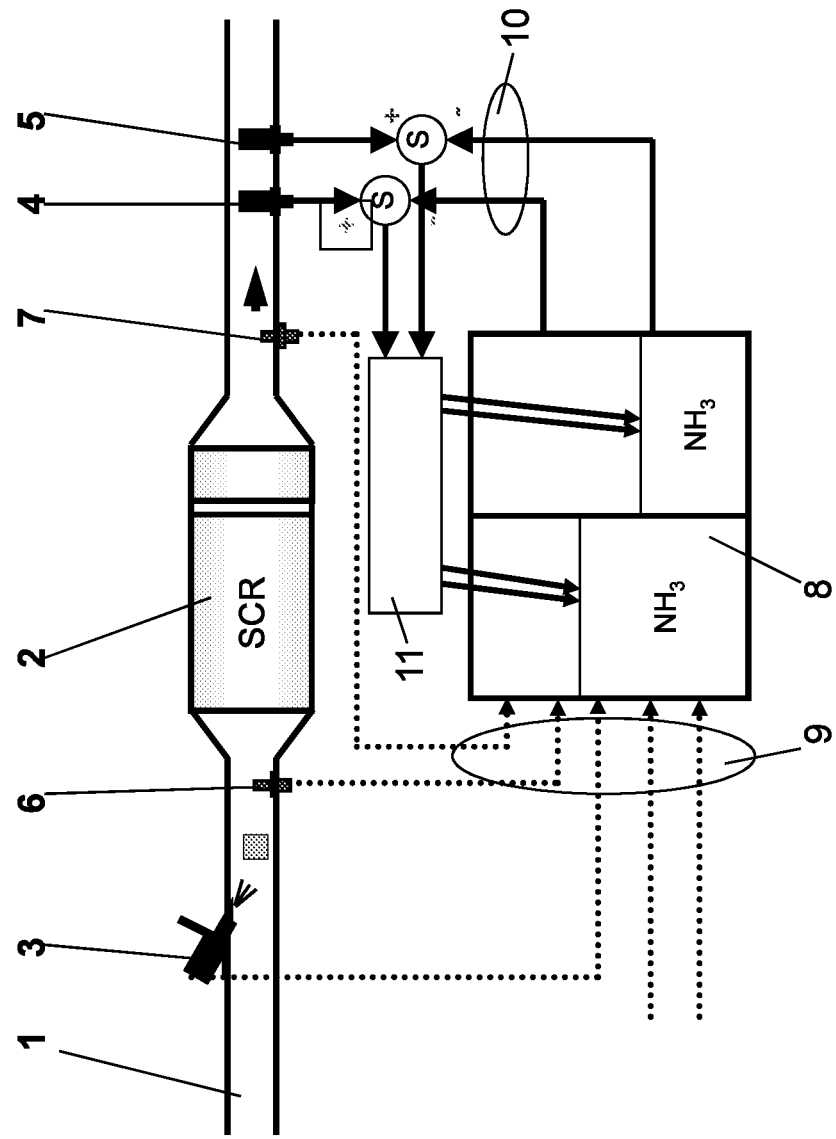
FIG. 1 an SCR known control scheme.
Figure 2:
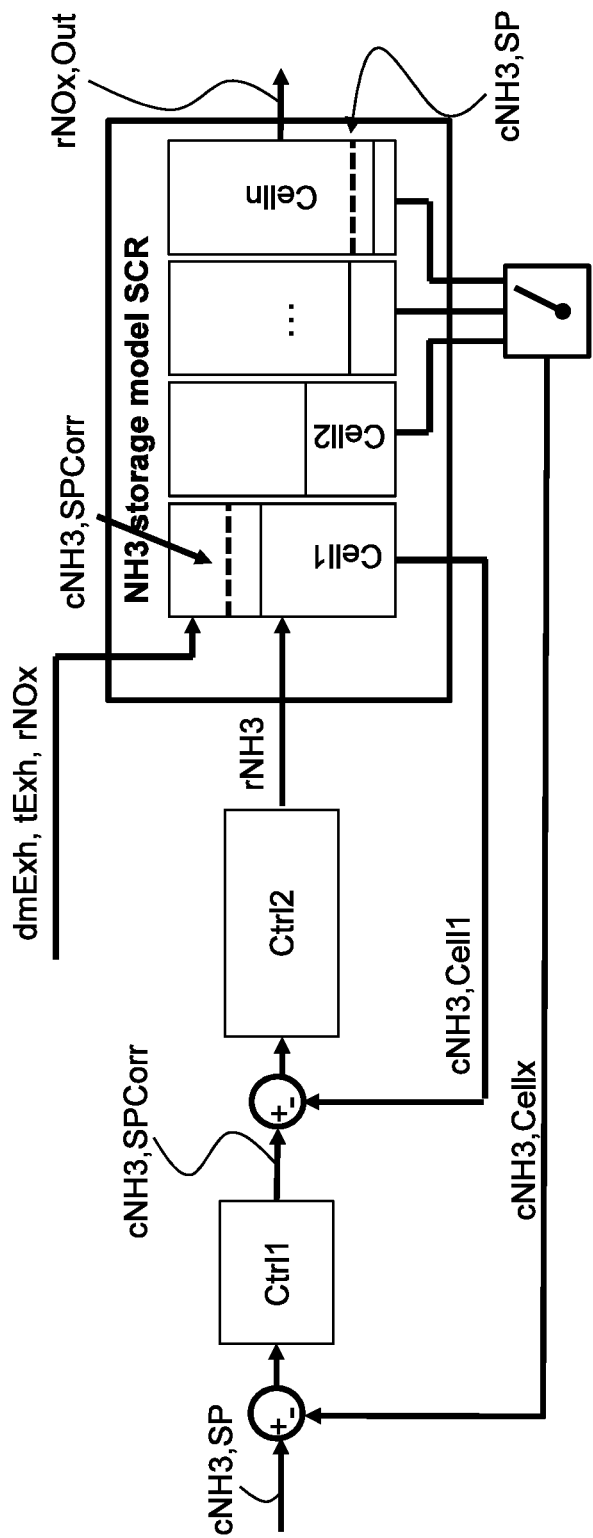
FIG. 2 shows a SCR model-based control scheme according to a first embodiment of the present invention.
Figure 3:
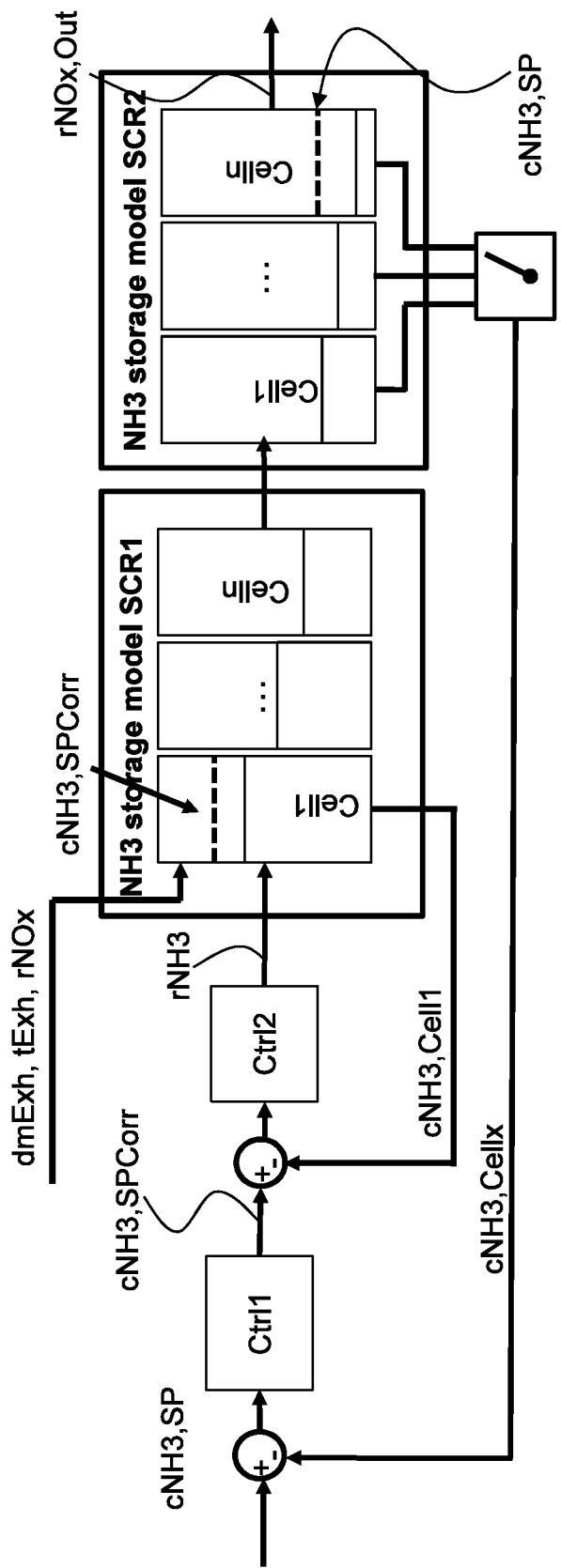
FIG. 3 shows a SCR model-based control scheme according to a second embodiment of the present invention.

With reference to FIGS. 2 and 3, the physical SCR catalytic converter is modelled through a NH3 storage model including a plurality of NH3 storage cells.

With "plurality", three or more cells are intended.

It is clear from the FIGS. 2 and 3 that the NH3 storage level decreases from the first to the last NH3 storage cell according to the exhaust gas circulation.

Thus, for convention, let us denote with cell1 the NH3 storage cell arranged close to the inlet of the SCR model and with Celln the last NH3 storage cell arranged close to the outlet of the SCR model.

A first loop control is based on the NH3 storage level cHN3,Cell1, which is compared with a reference value cNH3,SPCorr and the corresponding error is filtered through the controller Ctrl2 by generating the control signal rNH3. An increase of the control signal rNH3 leads to an increase of the amount of urea based agent injected within the dosing module and vice versa.

According to the present invention, the above loop is an inner loop. Indeed an outer loop exploits the NH3 storage level on a subsequent NH3 storage cell Cell2 . . . Celln to adjust the reference value cNH3,SPCorr.

Indeed the mentioned reference value is not a fixed set point, but a variable set point in response to the NH3 storage level cNH3,Cellx of one of the above subsequent NH3 storage cells.

The NH3 storage level cNH3,Cellx is compared with a fixed reference vale cNH3,SP and the error generated by the comparison is filtered through the controller Ctrl1.

Legend cNH3,SP=NH3 level fixed set point
cNH3,SPCorr=NH3 level variable set point for 1st cell of SCR1: it is a sort of corrected set point;
rNH3=Requested NH3 gas concentration, corresponding to a control signal for a urea based agent dosing module;
cNH3,Cell1=NH3 level of 1st cell of the overall SCR;
cNH3,Cellx=NH3 level of x-th cell of the overall SCR;
dmExh=Exhaust mass flow;
tExh=Exhaust temperature;
rNOx=Upstream NOx emissions;
rNOx,Out=Downstream NOx emissions;
Last four inputs dmExh, tExh, rNOx, rNOx,Out are obtained from real or virtual sensor and are needed from the NH3 storage model SCR.

For example, the exhaust temperatures are usually measured by inexpensive physical temperature sensors and upstream NOx emissions are measured by a physical NOx sensor.

The downstream NOx emissions can be estimated by a NOx sensor model, due to the well known ambiguity at the NOx sensor arranged downstream of the SCR due to its sensitivity to the NH3 slip.

FIG. 3 differ from FIG. 2 only for the implementation of two series arranged SCR devices SCR1, SCR2.

In this case, both the SCR devices are modelled and the plurality of NH3 storage cells are considered as distributed, preferably fairly in terms of storage capacity, along with the SCR catalytic converter formed by the two devices SCR1 and SCR2.

The same concept can be applied also to the cascade of three or more SCR devices.

In this case, the first NH3 storage cell Cell1 of the first SCR1, according to the exhaust circulation, and the NH3 storage cells of the last SCR device.

The adjustment of the set point of inner loop on the basis of the NH3 storage level of the last NH3 storage cells permit to obtain a fast saturation of NH3 at cold start, namely in a condition in which there is a strong inhomogeneous NH3 storage.

It is clear that the management of the urea based dosing module can be realized according to the present invention, by means of a control unit, preferably the same control unit ECU arranged to control the diesel engine.

According to both the model-base schemes in FIGS. 2 and 3, a switch is disclosed suitable to feedback the NH3 storage level of a group of NH3 storage cells. Such group of NH3 storage cells includes substantially the last two three cells of the SCR catalytic converter. This means that, when mode than one SCR device is implemented, the last cells belong to the last SCR device. According to the present description, the term first, second, etc. referring to the SCR devices and to the NH3 storage cells indicates the corresponding arrangement along with the engine exhaust line, thus first is the first SCR device or cell met by the exhaust gas.

This implies that the first NH3 storage cell is arranged at the inlet of the SCR catalytic converter, while the last cell is arranged substantially at the outlet of the SCR catalytic converter.

This invention can be implemented advantageously in a computer program comprising program code means for performing one or more steps of such method, when such program is run on a computer. For this reason the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. A method for controlling a SCR catalytic converter of a vehicle, comprising:
 a first step of modelling said SCR catalytic converter defined by a row of at least four $NH_3$ storage cells,
 a second step of controlling only a first $NH_3$ storage cell of said row of at least four $NH_3$ storage cells, according to feedback control based on a first reference value that represents a desired $NH_3$ storage level in the first $NH_3$ storage cell, and
 a third step of adapting said first reference value on the basis of a storage level of at least a second $NH_3$ storage cell of said row of at least four $NH_3$ storage cells,
 wherein said first NHs storage cell is arranged at an inlet of said SCR catalytic converter relative to an exhaust gas circulation flow path,
 wherein said second $NH_3$ storage cell is separated from said first $NH_3$ storage cell by at least a third $NH_3$ storage cell of said row of at least four $NH_3$ storage cells so that said second $NH_3$ storage cell is not consecutive with said first $NH_3$ storage cell,
 wherein said SCR catalytic converter comprises a plurality of SCR devices cascaded connected,
 said method further comprising identifying a first SCR device and a last SCR device according to said exhaust gas circulation flow path,
 wherein said plurality of SCR devices are modelled as comprising at least a first plurality of $NH_3$ storage cells of said first SCR device and a second plurality of $NH_3$ storage cells of said last SCR device distributed among said plurality of SCR devices,
 wherein said first $NH_3$ storage cell is arranged at an inlet of said first SCR device and said feedback control of said second step is performed in relation to said first SCR device, and
 wherein said second $NH_3$ storage cell belongs to said last SCR device and said adapting of said first reference value representing the desired $NH_3$ storage level in the first $NH_3$ storage cell of the first SCR device is based on the storage level of at least the second $NH_3$ storage cell belonging to said last SCR device; and
 controlling a urea based agent dosing module arranged upstream of the SCR catalytic converter to achieve an optimal saturation of the SCR catalytic converter in a condition in which there is a strong inhomogenous $NH_3$ storage.

2. The method according to claim 1, wherein said second NH3 storage cell is a last NH3 storage cell of said second plurality of NH3 storage cells.

3. The method according to claim 1, wherein said first reference value is raised proportionally to increase the NH3 storage within said second NH3 storage cell.

4. The method according to claim 1, wherein said second NH3 storage cell is a last NH3 storage cell of said SCR catalytic converter.

5. The method according to claim 1, wherein said second NH3 storage cell is selected iteratively within a last two-three of NH3 storage cells of said second plurality of NH3 storage cells.

6. A device for controlling a SCR catalytic converter of a vehicle, comprising a control unit configured to execute the method of claim 1.

7. A computer program comprising computer program code means adapted to perform all the steps of claim 1, when said program is run on a computer.

8. A computer readable medium having a program recorded thereon, said computer readable medium comprising computer program code means adapted to perform all the steps of claim 1, when said program is run on a computer.

9. A diesel combustion engine including an after treatment system arranged to treat pollutant contained inexhaust gas produced by the diesel engine, the after treatment system including a SCR catalytic converter and an engine control unit configured to control the diesel engine and to control a NH3 storage within said SCR catalytic converter according to any of the steps of claim 1.

10. The method according to claim 1, wherein the third step of varying said first reference value is carried out on the basis of a comparison between the storage level of said second NH3 storage cell and a second reference value, which is a fixed reference value.

* * * * *